Patented July 20, 1954

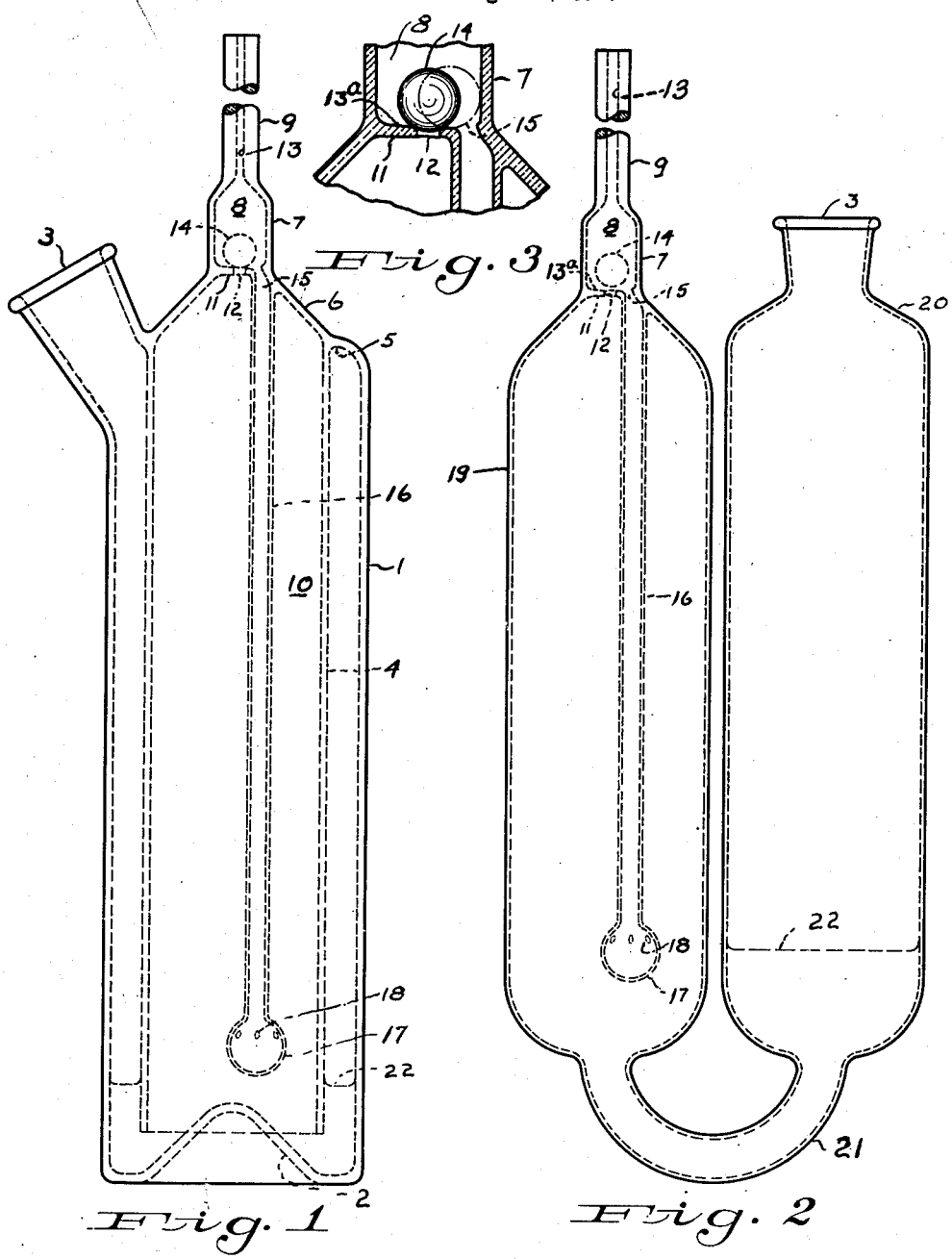

2,684,289

UNITED STATES PATENT OFFICE 2,684,289

GAS ANALYSIS PIPETTES

Lloyd V. Guild, Library, Pa.

Application August 10, 1949, Serial No. 109,436

2 Claims. (Cl. 23—292)

This invention relates to improvements in gas analysis pipettes of the bubbler type for use in the Orsat method of gas analysis, and it is among the objects thereof to provide a pipette structure utilizing a minimum volume of gas to displace the liquid from the valve system, whereby the analyses may be made by a single pass of the gas through the solution.

It is a further object of the invention to provide a bubbler pipette construction which will retain a minimum amount of the liquid in the valve system to prevent drawing part of the absorption solution into the gas measuring tube.

The invention will become more apparent from a consideration of the accompanying drawing, constituting a part hereof, in which like reference characters designate like parts, and in which:

Fig. 1 is a front elevational view of a gas analysis pipette embodying the principles of this invention;

Fig. 2 a front elevational view of a modified form of gas analysis pipette; and

Fig. 3 an enlarged fragmentary portion of the valve system of the pipette, as will be hereinafter explained.

With reference to the several figures of the drawing, numeral 1 designates a container usually made of glass which may have a reentrant bottom 2 and is sealed at the base, the reentrant bottom being of conical shape to be self-centering upon a complementary shaped seat (not shown) on a pipette support. The container 1 has an opening or neck 3 by which it is charged with a reagent liquid capable of absorbing specific gaseous components from a mixture of gas, and the volume change in the gas after passing through the reagent is the basis for calculating the analysis of that component.

Container 1 is provided with a cylindrical inner wall 4 which is sealed to the outer wall 1 at 5, the top of the container 1 terminating in a sloping wall 6 and a reduced portion 7 that forms a valve chamber designated by the numeral 8. The restricted portion 7 terminates in a capillary tube 9 which is connected by a rubber hose, or otherwise, to a source of gas to be analyzed. The chamber constituted by the cylindrical partition wall 4 and designated by the reference character 10, is the bubbling chamber which is separated from the valve chamber 8 by a partition 11 having a passage 12 which is a drilled or punched hole in axial alignment with the passage 13 of the capillary tube 9 so as to be in central register therewith.

As shown in the enlarged view of Fig. 3, the partition 11 has its upper wall sloping, as designated by the numeral 13a, and a ball valve 14, of glass or other suitable material, centers on the opening 12 but is capable of being displaced as shown by the dotted position of the ball valve 14. The top edge of the passage 12 is preferably sharp to provide a minimum seating surface for the ball 14. Chamber 8 is also provided with a flow passage 15 comunicating with a tube 16 that is the bubbler tube terminating in a spherical end 17 having perforations 18 through which the gas escapes into the absorption chamber 10.

In the form of the device shown in Fig. 2, the absorption tube 19 is separated from the storage container 20 and is connected thereto by a tube 21. The neck 7, the capillary tube 9, the valve chamber 8, and the ball valve 14 with the partition 11 and passages 12 and 15 are the same as described in connection with Fig. 1 of the drawing.

In the use of either of the devices shown in Figs. 1 and 2, the liquid absorbent is poured through the openings 3 and is drawn up to above the valve chamber 8 to a level within the capillary flow passage 13. The inner chamber or absorption chamber 10 is thus full of liquid and the outer chamber to about the level shown at 22. In filling the chamber 10 the ball valve 14 is unseated and the bubbler tube 16 is also full of liquid.

When gas is forced into the pipette through the passage 13, the glass ball 14 seals off the inlet 12 and the gas is forced through bubbler tube 16 and through the orifices 18 into the absorption chamber. As the gas bubbles from the spherical end 17 through the reagent solution, it will accumulate at the top of the cylindrical chamber 10 but will not unseat the valve 14 because the pressure differential is such that the pressure of the incoming gas through the capillary passage 13 retains the ball valve 14 on the seat of the opening 12.

When the charging pressure of the gas is released, valve 14 will unseat and the accumulated gases in absorption chamber 10 will escape through passage 12 and the volume change is noted. Since the tapered seat 13a of the ball valve 14 is ground at an angle which is approximately 8° from the horizontal, a sharp seal is effected between the ball and the opening, the slight slope acting to maintain the ball in its proper position. It is evident that no liquid remains in the valve chamber 8 and that the volume of said chamber is relatively small. Therefore accurate measurements of the gas volumes may be made. Also by sealing off the top of the inner cylindrical wall 4, there is no danger of air contamination as where a large area of the outer vessel is open to the atmosphere.

Since no liquid can be trapped in the valve system, no gas is required to displace liquid from the valve chamber and complete absorption may be effected by a single pass of the gas through the pipette.

Although one embodiment of the invention has been herein illustrated and described, it will be evident to those skilled in the art that various modifications may be made in the details of construction without departing from the principles herein set forth.

I claim:

1. In a gas analysis pipette, a container having a bubbler tube extending to adjacent the bottom thereof with perforations at the bottom of the tube, said tube terminating in a valve chamber, means for supplying a reagent solution to said container other than through the bubbler tube passage, a capillary connection from a source of gas to said valve chamber, the valve chamber having a horizontal partition with an opening in register with the center of the capillary tube, and a ball valve supported by said partition for sealing said passage, said partition having a ground tapered surface for centering the ball valve with the valve opening.

2. In a gas analysis pipette, a pair of containers having a communicating passage at the bottom of said containers, a bubbler tube extending to adjacent the bottom of one of said containers with perforations at the bottom of the tube, said tube terminating in a valve chamber at the top of the container, means for supplying a reagent solution through an opening in the other of said containers, a capillary connection from a source of gas to said valve chamber, the valve chamber having a horizontal partition with an opening in register with the center of the capillary tube, and a ball valve supported by said partition for sealing said passage, said partition having a ground tapered surface for centering the ball valve with the valve opening.

References Cited in the file of this patent

UNITED STATES PATENTS

| Number | Name | Date |
|---|---|---|
| 2,001,581 | Matuszak | May 14, 1935 |

FOREIGN PATENTS

| Number | Country | Date |
|---|---|---|
| 608,322 | France | Apr. 19, 1926 |
| 37,810 | France | Nov. 18, 1930 |
| | (1st addition to 608,322) | |

OTHER REFERENCES

Matuszak; "Fisher Gas Analysis Manual," Fisher Scientific Co., Pittsburgh, Pa., pages 54, 55. Copyright 1934.